US012613969B2

(12) United States Patent
Veluthakkal et al.

(10) Patent No.: US 12,613,969 B2
(45) Date of Patent: Apr. 28, 2026

(54) SYSTEMS AND METHODS FOR BMC FIRMWARE IDENTITY BASED ACCESS CONTROL

(71) Applicant: Dell Products, L.P., Round Rock, TX (US)

(72) Inventors: Sreeram Veluthakkal, Pflugerville, TX (US); Marshal F. Savage, Austin, TX (US); Eugene David Cho, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 494 days.

(21) Appl. No.: 18/048,878

(22) Filed: Oct. 24, 2022

(65) Prior Publication Data

US 2024/0134989 A1    Apr. 25, 2024
US 2024/0232364 A9    Jul. 11, 2024

(51) Int. Cl.
     *G06F 21/57*        (2013.01)
     *G06F 21/60*        (2013.01)
(52) U.S. Cl.
     CPC .......... *G06F 21/572* (2013.01); *G06F 21/602* (2013.01); *G06F 2221/033* (2013.01)

(58) Field of Classification Search
CPC . G06F 21/572; G06F 21/602; G06F 2221/033
See application file for complete search history.

(56) References Cited

U.S. PATENT DOCUMENTS

| | | | | |
|---|---|---|---|---|
| 11,698,969 | B1 * | 7/2023 | Henriquez Garcia | ...................... G06F 21/572 726/23 |
| 2018/0096151 | A1 * | 4/2018 | Ghetie | .................. G06F 21/575 |
| 2019/0052634 | A1 * | 2/2019 | Bhatia | ...................... G09C 1/00 |
| 2020/0257460 | A1 * | 8/2020 | Som | ...................... G06F 3/0673 |
| 2021/0240567 | A1 * | 8/2021 | Hsu | ...................... G06F 13/4282 |

* cited by examiner

*Primary Examiner* — Noura Zoubair
(74) *Attorney, Agent, or Firm* — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include a Baseboard Management Controller (BMC) having computer-executable instructions to, during a boot sequence of the BMC, determine a type of a firmware that is to be booted on the BMC, and selectively restrict access to the resources based upon the determined type of firmware.

16 Claims, 7 Drawing Sheets

400

402

SERVER
MANUFACTURER'S DATA
ENCRYPTION KEY

404

CUSTOMER'S DIY FW DATA
ENCRYPTION KEY

406

OPENSOURCE (E.G., OPEN BMC)
DATA ENCRYPTION KEY

SYSTEMS AND METHODS FOR BMC FIRMWARE IDENTITY BASED ACCESS CONTROL

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via Baseboard Management Controllers (BMCs) also referred to as Remote Access Controllers (RACs). The BMC generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

Embodiments of systems and methods to provide a firmware update to devices configured in a redundant configuration in an Information Handling System (IHS) are disclosed. In an illustrative, non-limiting embodiment, an IHS may include a Baseboard Management Controller (BMC) having computer-executable instructions to, during a boot sequence of the BMC, determine a type of a firmware that is to be booted on the BMC, and selectively restrict access to the resources based upon the determined type of firmware.

According to another embodiment, a Baseboard Management Controller (BMC) firmware identity access control method includes the steps of determining a type of a firmware that is to be booted on the BMC during a boot sequence, and selectively restricting access to at least one resource of an Information Handling System (IHS) based upon the determined type of firmware.

According to yet another embodiment, a memory storage device stored with program instructions is executable by one or more processors of a client Information Handling System (IHS) to, during a boot sequence of a Baseboard Management Controller (BMC), determine a type of a firmware that is to be booted on the BMC, and selectively restrict access to at least one resource of the IHS based upon the determined type of firmware.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
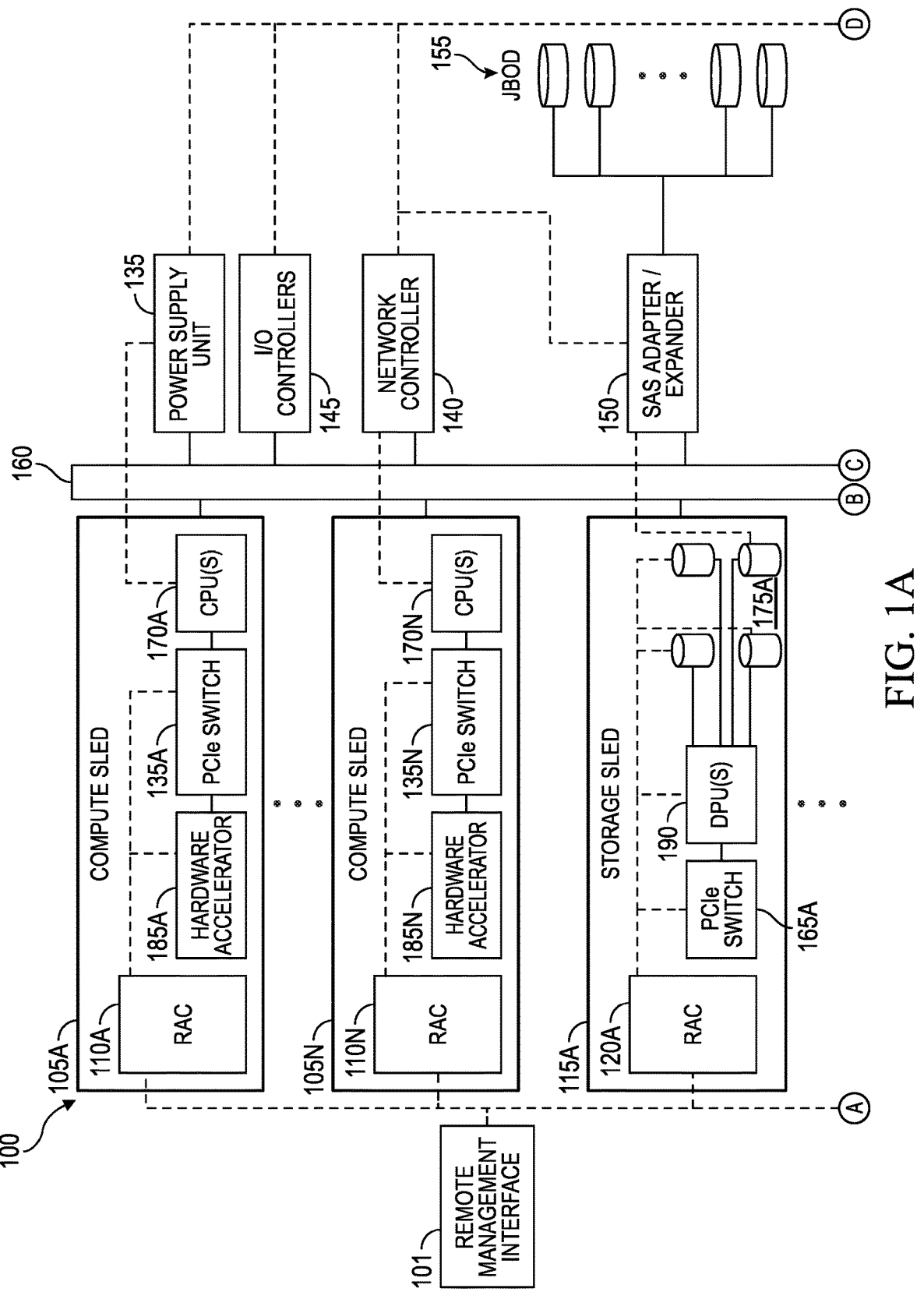
FIGS. 1A and 1B are block diagrams illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance comput- ing (HPC), telecommunications, and cloud-scale data cen- ters. As such, BMCs may need to support multiple firmware types (e.g., server manufacturer's firmware, open-source firmware like OpenBMC etc.) based on product offerings or customer requirements.

While custom BMC firmware stacks, such as those imple- mented according to openBMC standards, may provide enhanced manageability, transparency, and customization, its implementation has not been without drawbacks. For example, standard BMC firmware stacks are often imple- mented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL CORPORATION. On the other hand, custom BMC firm- ware stacks, which are typically developed in uncontrolled environments, often possess relatively higher levels of soft- ware faults (e.g., bugs).

This drawback can be particularly problematic when certain control functions allocated to the BMCs can ruin or damage their respective IHSs if not properly managed. For example, whereas BMCs may be configured to control the fan speed of any of a number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory com- ponents.

A BMC may include various types of resources that may each be associated with a certain level of security. Examples of such resources may include, but not limited to coproces- sors, GPIOs, UARTS, Memory Controller Registers, cryp- tography engines, peripheral bus access, and the like. Addi- tionally, proprietary executable code and/or data may include, but not limited to, encrypted user firmware data, security keys, configuration files, and the like. Such resources should be inaccessible by any firmware other than the server manufacturer's firmware. To support warranties on the IHSs even when a customer specific (DIY) or open-source firmware is used, server manufacturers may need access to some, most, or all available data stored on the BMC, even when they are managed by such firmware other than the IHS manufacture's firmware. Hence there exists a need for hierarchical access configuration of secure resources of the BMC. As will be described in detail herein below, embodiments of the present disclosure provide a system and method for BMC firmware identity access control that, during bootstrapping of the BMC, detect a firmware type that is being booted, and based upon the detected firmware type, selectively restrict access to certain resources.

For purposes of this disclosure, an IHS may include any instrumentality or aggregate of instrumentalities operable to compute, calculate, determine, classify, process, transmit, receive, retrieve, originate, switch, store, display, commu- nicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, function- ality, and price.

The IHS may include random access memory (RAM), one or more processing resources such as a central process- ing unit (CPU) or hardware or software control logic, ROM, and/or other types of nonvolatile memory. Additional com- ponents of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1B:
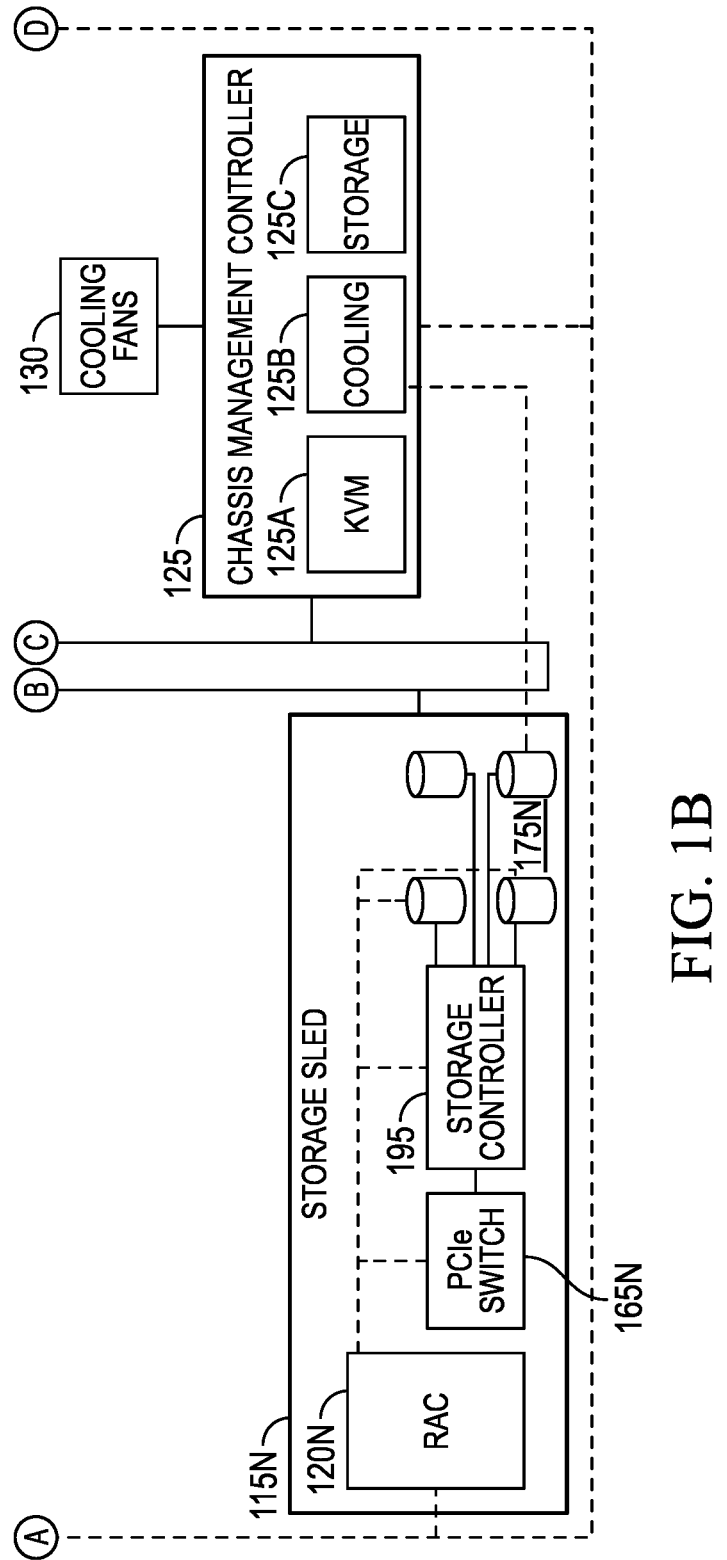

FIGS. 1A and 1B are block diagrams illustrating certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components speci- fied by a customer that has contracted for manufacture and delivery of chassis 100. Upon delivery and deployment of a chassis 100, the chassis 100 may be modified by replacing and/or adding various hardware components, in addition to replacement of the removable sleds 105*a-n*, 115*a-n* that are installed in the chassis. In addition, once the chassis 100 has been deployed, firmware used by individual hardware com- ponents of the sleds 105*a-n*, 115*a-n*, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include addi- tional types of sleds that provide various storage, power and/or processing capabilities. For instance, sleds installable in chassis 100 may be dedicated to providing power man- agement or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cool- ing, power and network bandwidth, to be shared by the compute sleds 105*a-n* and storage sleds 115*a-n*, thus pro- viding efficiency improvements and supporting greater com- putational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165*a-n* installed in the sleds 105*a-n*, 115*a-n* of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185*a-n* operate according to firmware instructions that may be occasionally updated, such as to adapt the capabilities of the respective hardware accelerators 185*a-n* to specific computing tasks.

Chassis 100 may be installed within a rack structure that provides at least a portion of the cooling utilized by the sleds 105*a-n*, 115*a-n* installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105*a-n*, 115*a-n* installed within the chassis. In this manner, a rack and a chassis 100 installed within the rack may utilize various configurations and combinations of cooling fans 130 to cool the sleds 105*a-n*, 115*a-n* and other components housed within chassis 100.

The sleds 105*a-n*, 115*a-n* may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105*a-n*, 115*a-n* to backplane 160 include PCIe couplings that support high-speed data links with the sleds 105*a-n*, 115*a-n*. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
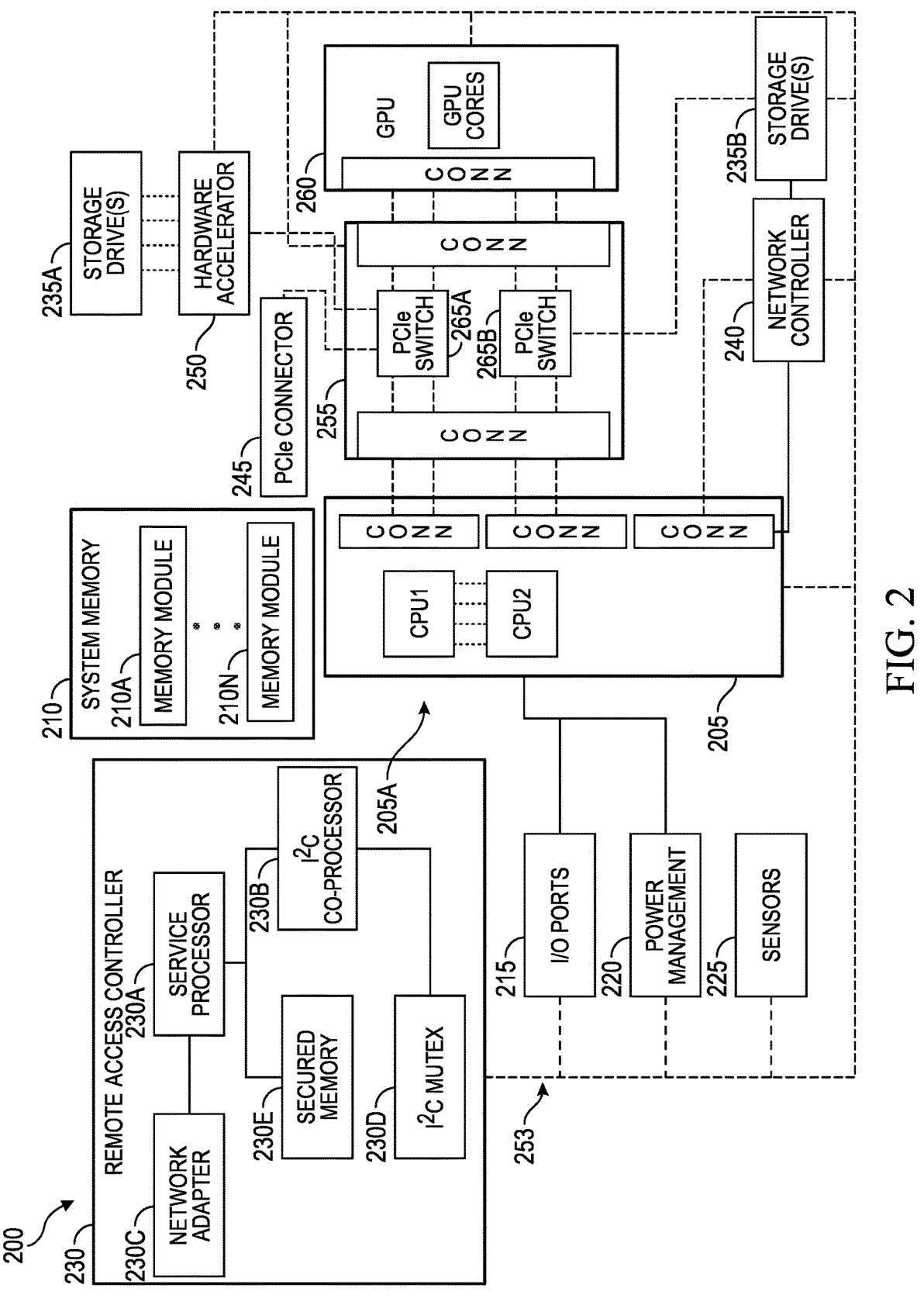
FIG. 2 illustrates an example of an IHS configured to implement systems and methods described herein according to one embodiment of the present disclosure.

In certain embodiments, each individual sled 105*a-n*, 115*a-n* may be an IHS such as described with regard to IHS 200 of FIG. 2. Sleds 105*a-n*, 115*a-n* may individually or collectively provide computational processing resources that may be used to support a variety of e-commerce, multimedia, business, and scientific computing applications, such as artificial intelligence systems provided via cloud computing implementations. Sleds 105*a-n*, 115*a-n* are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105*a-n*, 115*a-n* be likewise made without having to reboot the respective sled of the hardware component that is being updated.

As illustrated, each sled 105*a-n*, 115*a-n* includes a respective remote access controller (RAC) 110*a-n*, 120*a-n*. As described in additional detail with regard to FIG. 2, remote access controller 110*a-n*, 120*a-n* provides capabilities for remote monitoring and management of a respective sled 105*a-n*, 115*a-n* and/or of chassis 100. In support of these monitoring and management functions, remote access controllers 110*a-n* may utilize both in-band and sideband (i.e., out-of-band) communications with various managed components of a respective sled 105*a-n* and chassis 100. Remote access controllers 110*a-n*, 120*a-n* may collect diverse types of sensor data, such as collecting temperature sensor readings that are used in support of airflow cooling of the chassis 100 and the sled 105*a-n*, 115*a-n*. In addition, each remote access controller 110*a-n*, 120*a-n* may implement various monitoring and administrative functions related to a respective sled 105*a-n*, 115*a-n*, where these functions may be implemented using sideband bus connections with various internal components of the chassis 100 and of the respective sleds 105*a-n*, 115*a-n*. As described in additional detail below, in various embodiments, these capabilities of the remote access controllers 110*a-n*, 120*a-n* may be utilized in updating the firmware of hardware components of chassis 100 and/or of hardware components of the sleds 105*a-n*, 115*a-n*, without having to reboot the chassis or any of the sleds 105*a-n*, 115*a-n*.

The remote access controllers 110*a-n*, 120*a-n* that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175*a-n* installed in a chassis 100, or to all of the storage drives 175*a-n* of a particular model or manufacturer. In some instances, remote management interface 101 may include an inventory of the hardware, software, and firmware of chassis 100 that is being remotely managed through the operation of the remote access controllers 110*a-n*, 120*a-n*. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks)

storage resources 155 that, in some instances, may be configured and managed individually and without implementing data redundancy across the various drives. The additional JBOD storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n* or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205*a*. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200, and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. Each of the PCIe switches 265*a-b* may operate according to firmware instructions that may be occasionally updated.

Using the available PCIe lanes, the PCIe switches 265*a-b* may be used to implement a PCIe switch fabric. Also through this switch fabric, PCIe NVMe (Non-Volatile Memory Express) transmission may be supported and utilized in high-speed communications with SSDs, such as storage drives 235*a-b*, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235*a-b* in various topologies, in the same manner as described with regard to the chassis 100 of FIG. 1. In the illustrated embodiment, storage drives 235*a* are accessed via a hardware accelerator 250, while storage drives 235*b* are accessed directly via PCIe switch 265*b*. In some embodiments, the storage drives 235*a-b* of IHS 200 may include a combination of both SSD and magnetic disk storage drives. In other embodiments, all of the storage drives 235*a-b* of IHS 200 may be identical, or nearly identical. In all embodiments, storage drives 235*a-b* operate according to firmware instructions that may be occasionally updated.

As illustrated, PCIe switch 265*a* is coupled via a PCIe link to a hardware accelerator 250, such as a DPU, Smart-NIC, GPU and/or FPGA, that may be connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator 250 may operate according to firmware instructions that may be occasionally updated.

In the illustrated embodiment, the programmable capabilities of hardware accelerator 250 implement functions used to support storage drives 235*a*, such as SSDs. In such storage drive topologies, hardware accelerator 250 may implement processing of PCIe NVMe communications with SSDs 235*a*, thus supporting high-bandwidth connections with these SSDs. Hardware accelerator 250 may also include one more memory devices used to store program instructions executed by the processing cores and/or used to support the operation of SSDs 235*a* such as in implementing cache memories and buffers utilized in support of high-speed operation of these storage drives, and in some cases may be used to provide high-availability and high-throughput implementations of the read, write and other I/O operations that are supported by these storage drives 235*a*. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the CPUs 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement an I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
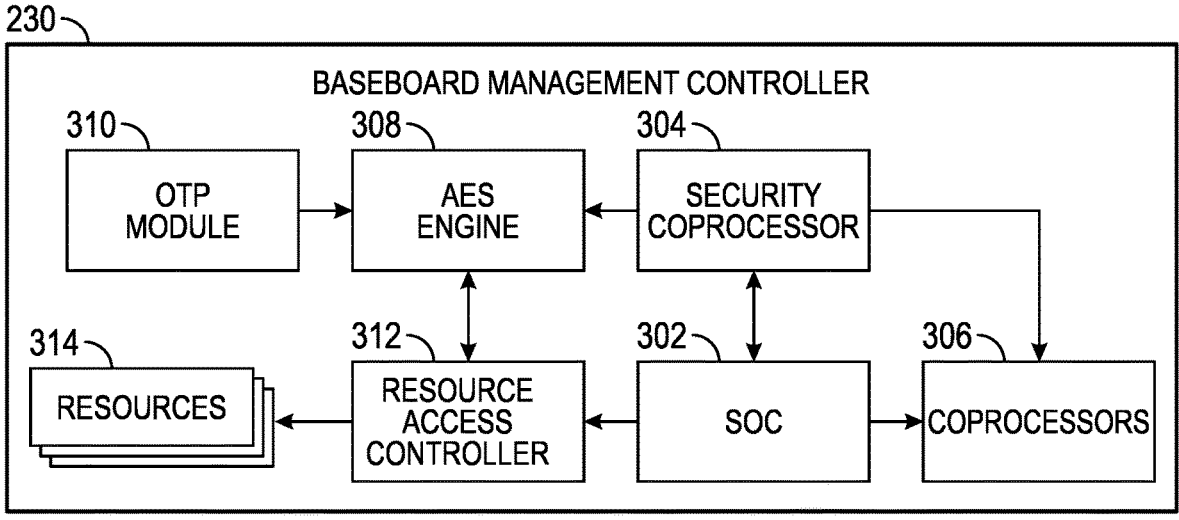
FIG. 3 illustrates several components of a BMC that may implement a BMC Firmware Identity Access Control system according to one embodiment of the present disclosure.

FIG. 3 illustrates several components of a BMC 230 that may implement a BMC Firmware Identity Access Control system according to one embodiment of the present disclosure. The BMC 230 generally includes a SoC 302, a security coprocessor 304, one or more other coprocessors 306, an AES engine 308, an OTP module 310, a resource access controller 312, and one or more resources 314. The SoC 302 is used to boot and run firmware for managing the operation of its associated IHS 200. The firmware running on the BMC 230 may run an IHS manufacturer's firmware, an open-source firmware or a customer's do-it-yourself (DIY) firmware.

The security coprocessor 304 generally functions as a security enclave to control access to resources 314 based on the BMC firmware type or identity. While the security coprocessor 304 is described herein as being embodied on a coprocessor that is separate and distinct from the SoC 302 that runs the BMC firmware, in other embodiments, the security coprocessor 304 may be implemented on the SoC 302 (or any other suitable component) in a manner such that it is protected (secured) from the firmware running on the SoC 302.

The bootloader of the BMC 230 includes a Mask ROM (MROM) portion that powers the security coprocessor 304 on first. The MROM essentially forms an immutable portion of the BMC's firmware because it is loaded at first power on and is masked when ensuing portions are loaded and executed. The firmware running on the security coprocessor 304 is locked by the IHS manufacturer and is the first component to boot on SoC power on. In addition, the BMC bootloaders may also be under control of the IHS manufacturer. The security coprocessor 304 is responsible for generating data at rest keys for the BMC firmware. The keys may be created in the factory or on a customer premise when required. The keys may also be stored in a flash storage or in the OTP module 310. Additionally, the keys may be derived from a hardware rooted key which is provisioned into each SoC 302 during the platform manufacturing process. For example, the hardware rooted key may be generated by the manufacturer of the SoC chip. The security coprocessor 304 may also configure or direct the BMC bootloaders to configure the module control registers during power on.

The resources 314 may include any component, executable code, or data storage (e.g., mapped memory segments, registers, etc.) for which security from the BMC's firmware may be desired. Examples of such resources may include coprocessors 306, GPIOs, UARTS, Memory Controller Registers, cryptography engines, peripheral bus access, and the like. Additionally, the resources 314 may include those configured on the BMC 230 as well as those configured on the IHS 200 itself.

The security coprocessor 304 controls access to the resources 314 via the AES engine 308 and resource access controller 312. For example, the resource access controller 312 may include one or more registers or other suitable data storage that may be set by the security coprocessor 304 via the AES engine 308 so that during the operation of the firmware on the BMC 230, the resource access controller 312 may intercept requests for access to the resources 314 of the IHS 200 and either allow or disallow the request based upon the settings in the registers.

Upon initial power on the security coprocessor 304 detects the type of firmware (e.g., IHS manufacturer's firmware, an open-source firmware or a customer's DIY firmware) to be loaded and executed by the SoC 302. To detect the type of firmware, the security coprocessor 304 may measure the operation of the firmware, such as by detecting when certain operations occur and any particular sequence that those operation occur in. In one embodiment, the security coprocessor 304 may detect the type of firmware by identifying a particular sequence of executable code within the firmware. During BMC Boot, the security enclave waits for BMC firmware measurements from the BMC bootloader as a part of the Secure boot flow or measures the BMC eMMC directly to identify the BMC firmware that is currently booting. If the BMC firmware identity is not seen before, the security enclave generates keys required for that firmware and stores it securely before proceeding to the next step.

When the type of firmware is detected, the security coprocessor 304 loads security keys into the AES engine 308 based upon the firmware type. Additionally, the AES engine 308 may receive security keys from the OTP module 310. Based upon the keys received, the AES engine 308 decrypts the keys to determine which resources 314 are restricted using the resource access controller 312. Additionally, the security coprocessor 304 may control which firmware to load and execute on the various coprocessors 306 as well as when and how they may be reset.

A configuration file or Access control list in the security coprocessor 304 defines which key(s) are to be loaded and to which locations based on the BMC firmware identity measurement. This configuration policy/list is packaged in the firmware and is modifiable by the server manufacturer with a firmware update. The security coprocessor 304 then loads the required keys into the AES engine 308 directly or through any side band port to the OTP module 310 provided by the SoC 302. The security coprocessor 304 may also load these keys into its own registers which are required for any services that are provided to the BMC firmware. In one embodiment, the security coprocessor 304 may lock access to the keys in its storage location and key registers of the AES engine 308 so that BMC firmware cannot access or modify any of them. During its runtime, the BMC firmware may initiate encryption/decryption operations based on the key index of the default AES engine 308 or via the security coprocessor 304 without requiring knowledge of what key needs to be used.

The configuration file may define the register values of the resource access controller 312 that will be used to control resource access based on the BMC firmware identity measurement. These values may be set by the security coprocessor 304 or by the BMC bootloader and may be locked based on the BMC firmware identity. Any access to a resource 314 that is not allowed by a BMC firmware type may be blocked by the SoC 302.

For additional coprocessors 306, the security coprocessor 304 may configure control access to the BMC by loading the Coprocessor's firmware and disabling reset control access from the BMC firmware. For example, the IHS manufacturer may use a particular coprocessor 306 for thermal/power management using an I2C channel. On power on, if the security coprocessor 304 detects a DIY firmware type, the coprocessor 306 can be configured to load a certain firmware for this purpose and lock reset control and firmware load offset in the memory of the BMC 230 so that the BMC 230 cannot control what firmware runs on the coprocessor 306 or hold it in reset.

Figure 4:
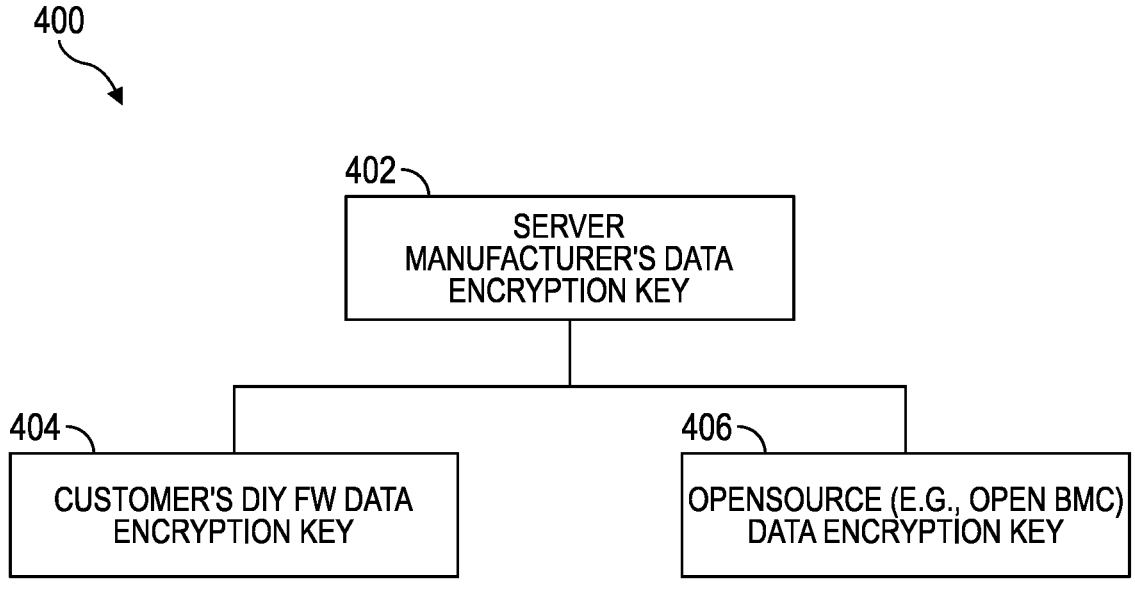
FIG. 4 illustrates an example encryption key hierarchy that may be defined in the configuration of the security coprocessor according to one embodiment of the present disclosure.

FIG. 4 illustrates an example encryption key hierarchy 400 that may be defined in the configuration of the security coprocessor 304 according to one embodiment of the present disclosure. The encryption key hierarchy 400 includes an IHS manufacturer's data encryption key 402 that serves as a master key for the other keys 404, 406 generated by the security coprocessor 304. For example, the other keys may include a customer's DIY firmware data encryption key 404 and an opensource (e.g., openBMC) data encryption key 406, which may be signed by the IHS manufacturer's data encryption key 402 to vouch for their authenticity.

Figure 5:
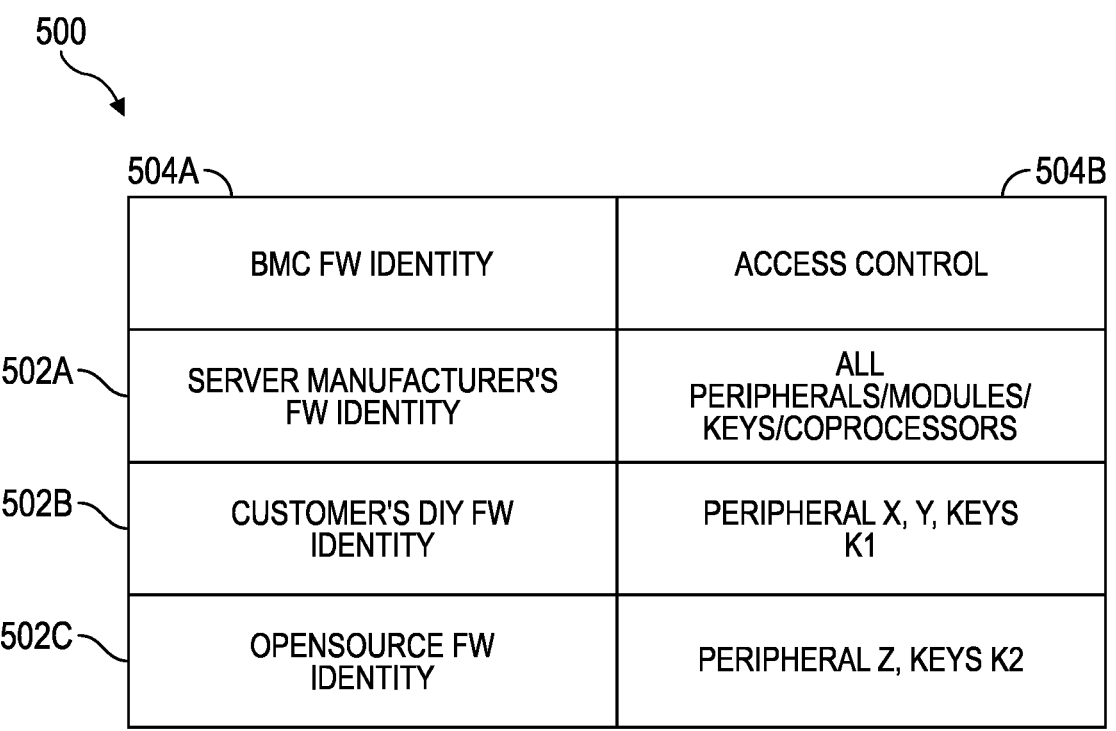
FIG. 5 illustrates an example access control table showing how certain resources may be restricted from access based upon the firmware type running on the BMC according to one embodiment of the present disclosure.

FIG. 5 illustrates an example access control table 500 showing how certain resources 314 may be restricted from access based upon the firmware type running on the BMC 230 according to one embodiment of the present disclosure. For example, the access control table 500 may represent values stored in a configuration file or other secure storage location that may be accessed by the security coprocessor 304, but restricted from the SoC 302. In general, the access control table 500 may be considered as policies to be enforced on a BMC's firmware based upon its type. Additionally, these policies may be configurable by a manufacturer of the IHS 200 and associated BMC 230.

The access control table 500 include rows 502 representing each type of firmware that may be loaded and executed on the BMC 230, and columns for indicating an identity of the firmware 504a, and resources 314 that may, or may not be restricted based upon the firmware type. In the example access control table 500 shown, column 504b represents resources 314 that may be whitelisted, that is, those resources listed in column 504b may be allowed for use by the firmware identified in column 504a. Nevertheless, it should be appreciated that in other embodiments, column 504b may indicate those resources 314 that are blocklisted, that is, those resources that are restricted from use by the firmware identified in column 504a.

Figure 6:
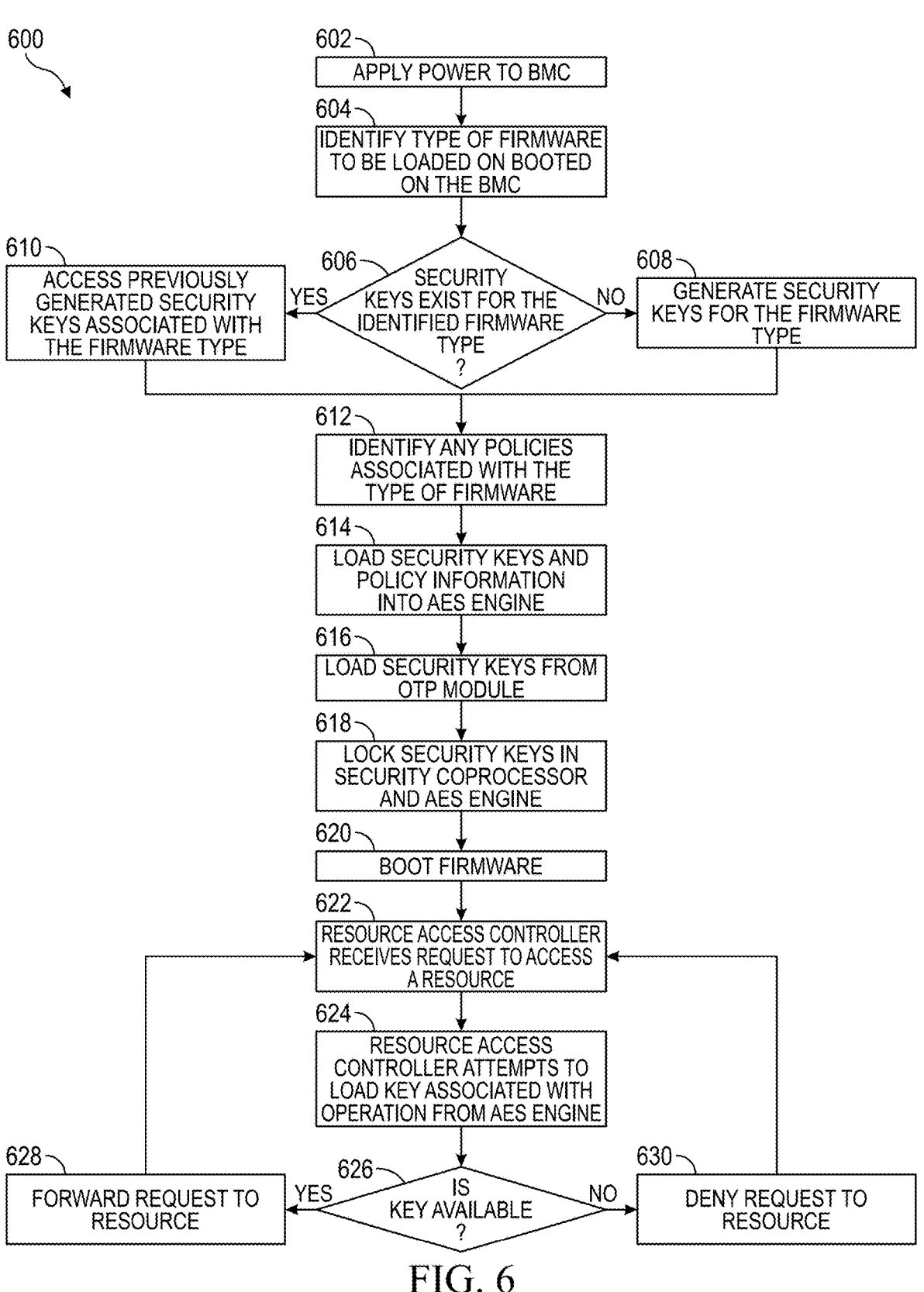
FIG. 6 illustrates an example BMC Firmware Identity Access Control method according to one embodiment of the present disclosure.

FIG. 6 illustrates an example BMC Firmware Identity Access Control method 600 according to one embodiment of the present disclosure. The BMC Firmware Identity Access Control method 600 may be performed at least in part, by a BMC 230, such as described above with reference to FIG. 3. The BMC Firmware Identity Access Control method 600 may be performed at any suitable time. In one embodiment, the method 600 may be performed each time the BMC 230 is booted or powered on.

Initially at step 602, power is applied to the BMC 230, such as when its associated IHS 200 is also powered on. At step 604, the method 600 identifies a type of firmware to be loaded on the BMC. For example, the method 600 may access the firmware stored in the memory of the BMC 230 and extract certain features of the firmware to determine its type. At this point, none of the firmware has yet been loaded; that is, the SoC 302 is maintained in a quiescent idle state. At step 606, the method 600 determines whether any security keys exist for the identified firmware. If not, processing continues at step 608 to generate a new set of security keys for that type of firmware; otherwise, processing continues at step 610 in which the security keys for that type of firmware are accessed from a suitable secure memory location.

At step 612, the method 600 identifies any policies associated with the type of firmware. For example, the method 600 may access the policies from a secure storage location, such as a securely stored configuration file. The policies may be, for example, similar to those described above with reference to FIG. 5. The method 600 then loads the security keys and policy information into the AES engine 308 at step 614. In one embodiment, the method 600 may load the security keys and policy information via a sideband key port. At step 616, the method 600 loads the security keys from OTP module 310, such as using the sideband key port. The AES engine 308 may use the security keys from the OTP module 310 to verify the authenticity of the security keys obtained from the security coprocessor 304. Thereafter, the method 600 locks the security keys in the security coprocessor 304 and AES engine at step 618.

At this point, the method 600 is prepared to allow the firmware to be booted on the SoC 302 at step 620. After the firmware has been booted and is currently executing on the SoC 302, the resource access controller 312 receives a request to perform an operation on a resource from the firmware executing on the SoC 302 at step 622. At step 624, the resource access controller 312 attempts to load a key associated with the operation from the AES engine 308. At step 626, the resource access controller 312 determines if the key is available. If so, processing continues at step 628 in which the resource access controller 312 forwards the request to the resource 314; otherwise, processing continues at step 630 in which the resource access controller 312 denies the request, such as by not forwarding the request to the resource 314.

Once the request is either allowed or denied, processing continues at step 622 to process other requests from the firmware running on the SoC 302. Nevertheless, when the BMC 230 is turned off the method 600 ends.

While FIG. 6 illustrates an example BMC Firmware Identity Access Control method 600 that may be implemented to regulate a SoC firmware's access to resources based on its type, the features of the disclosed processes may be embodied in other specific forms without deviating from the spirit and scope of the present disclosure. For example, certain steps of the disclosed method 600 may be performed sequentially, or alternatively, they may be performed concurrently. As another example, the method 600 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:
1. An Information Handling System (IHS) that comprises:
a plurality of resources; and
a baseboard management controller (BMC) in communication with the plurality of resources, wherein the BMC comprises a plurality of BMC processors distinct from any IHS host processor, and one or more memory units that comprise instructions structured to, upon execution by a first BMC processor of the plurality of BMC processors, cause the BMC to perform operations that comprise:

power the first BMC processor and boot the first BMC processor with a first BMC processor bootloader read from a Mask ROM (MROM) while any other BMC processors remain unpowered;

determine, by the first BMC processor bootloader, based, at least in part, upon detection of a particular executable code sequence in a firmware that is to be booted by a second BMC processor of the plurality of BMC processors, a type of the firmware;

in response to a determination by the first BMC processor, based, at least in part, upon the type of the firmware that a security key for the type of the firmware does not exist, generate the security key based upon the type of the firmware, wherein the type of the firmware comprises at least one of an IHS manufacturer's firmware, an open-source firmware, or a customer's do-it-yourself (DIY) firmware; and based at least in part on the security key, allow or disallow use of the plurality of resources by the second BMC.

2. The IHS of claim 1, wherein the BMC is configured to power the first BMC processor before the second BMC processor.

3. The IHS of claim 1, wherein the instructions, upon execution, cause the BMC to restrict the firmware, when executed, from access to at least one of an executable code of the first BMC processor or a data segment of the first BMC processor.

4. The IHS of claim 1, wherein the instructions, upon execution by the first BMC processor, cause the BMC to determine the type of the firmware before the second BMC processor is allowed to boot the firmware.

5. The IHS of claim 1, wherein the instructions, upon execution, cause the BMC to derive the security key from a hardware rooted key that is provisioned in the first BMC processor when manufactured.

6. The IHS of claim 1, wherein the instructions, upon execution, cause the BMC to:

set one or more registers in a resource access controller based upon the type of firmware; and when the firmware is executed on the BMC, either allow or disallow a request based upon the one or more registers.

7. The IHS of claim 6, wherein the instructions, upon execution, cause the BMC to restrict the firmware from access to the resource access controller when the firmware is executed on the second BMC processor.

8. A Baseboard Management Controller (BMC) firmware identity access control method comprising:

during a boot sequence of a BMC configured in or coupled to an Information Handling System (IHS) that comprises a plurality of resources, wherein the BMC comprises a plurality of BMC processors distinct from any IHS host processor:

powering a first BMC processor of the plurality of BMC processors and booting the first BMC processor with a first BMC processor bootloader read from a Mask ROM (MROM) while any other BMC processors remain unpowered;

determining, using the first BMC processor bootloader, a type of a firmware that is to be booted by a second BMC processor of the plurality of BMC processors, based, at least in part, upon detecting a particular executable code sequence in the firmware; and in response to determining by the first BMC processor, based, at least in part, upon the type of the firmware, that a security key for the type of the firmware does not exist, generating the security key based upon the type of the firmware, wherein the type of the firmware comprises at least one of an IHS manufacturer's firmware, an open-source firmware, or a customer's do-it-yourself (DIY) firmware; and allowing or disallowing use of the plurality of resources by the second BMC based at least in part on the security key.

9. The BMC firmware identity access control method of claim 8, further comprising powering the first BMC processor before the second BMC processor.

10. The BMC firmware identity access control method of claim 8, further comprising restricting the firmware, when executing, from accessing at least one of an executable code of the first BMC processor or a data segment of the first BMC processor.

11. The BMC firmware identity access control method of claim 8, further comprising determining the type of the firmware prior to booting the firmware on the second BMC processor, based at least in further part upon detecting a particular sequence of certain operations.

12. The BMC firmware identity access control method of claim 8, further comprising deriving the security key from a hardware rooted key that is provisioned in the first BMC processor when manufactured.

13. The BMC firmware identity access control method of claim 8, further comprising:

setting one or more registers in a resource access controller based upon the type of firmware; and when the firmware is being executed on the BMC, either allowing or disallowing a request based upon the one or more registers.

14. The BMC firmware identity access control method of claim 13, further comprising restricting the firmware from accessing the resource access controller when the firmware is being executed on the second BMC processor.

15. A memory storage device with program instructions stored thereon that, upon execution by a first Baseboard Management Controller (BMC) processor of a BMC configured in an Information Handling System (IHS) that comprises a plurality of resources, wherein the BMC comprises a plurality of BMC processors distinct from any IHS host processor, cause the BMC to perform operations that comprise:

boot a first BMC processor of the plurality of BMC processors with a first BMC processor bootloader read from a Mask ROM (MROM) while any other BMC processors remain unpowered;

while a boot sequence of the BMC is active on the first BMC processor, determine, by the first BMC processor bootloader, based, at least in part, upon detection of a particular executable code sequence in a firmware that is to be booted by a second BMC processor of the plurality of BMC processors, a type of the firmware;

in response to a determination by the first BMC processor, based, at least in part, upon the type of the firmware, that a security key for the type of the firmware does not exist, generate the security key based upon the type of the firmware, wherein the type of the firmware comprises at least one of an IHS manufacturer's firmware, an open-source firmware, or a customer's do-it-yourself (DIY) firmware; and allow or disallow use of the plurality of resources by the second BMC based at least in part on the security key.

16. The memory storage device of claim 15, wherein the instructions, upon execution by the first BMC processor, cause the BMC to restrict the firmware, when executed by the second BMC processor, from access to at least one of an executable code of the first BMC processor or a data segment of the first BMC processor.

* * * * *